United States Patent [19]

Fouilloy

[11] Patent Number: 5,402,168

[45] Date of Patent: Mar. 28, 1995

[54] MULTI-STANDARD OBSERVATION CAMERA AND A SURVEILLANCE SYSTEM USING THE CAMERA

[75] Inventor: Jean-Pierre Fouilloy, Velizy, France

[73] Assignee: Thomson-CSF, Puteaux, France

[21] Appl. No.: 69,111

[22] Filed: May 28, 1993

[30] Foreign Application Priority Data

Jun. 16, 1992 [FR] France ................................ 92 07256

[51] Int. Cl.⁶ .............................................. H04N 5/33
[52] U.S. Cl. ..................... 348/164; 348/295
[58] Field of Search ............... 348/164, 168, 295, 322; 250/334; H04N 7/18, 5/33

[56] References Cited

U.S. PATENT DOCUMENTS

| | | | |
|---|---|---|---|
| 4,397,429 | 8/1983 | Fouilloy | 244/3.11 |
| 4,609,824 | 9/1986 | Munier | 348/164 |
| 4,761,652 | 8/1988 | Pirolli et al. | 342/53 |
| 4,768,097 | 8/1988 | Grenier | 348/311 |
| 4,942,468 | 7/1990 | Yokouchi et al. | |
| 5,149,969 | 9/1992 | Fouilloy et al. | 250/334 |

FOREIGN PATENT DOCUMENTS

| | | |
|---|---|---|
| 0148654 | 7/1985 | European Pat. Off. |
| 0235002 | 9/1987 | European Pat. Off. |
| 3903091 | 8/1990 | Germany |
| 2152328 | 7/1985 | United Kingdom |
| 2191058 | 12/1987 | United Kingdom |

OTHER PUBLICATIONS

Patent Abstracts of Japan, vol. 14, No. 574, (P-1145), Dec. 20, 1990, & JP-A-22 45 728, Oct. 1, 1990, Emoto Fumiaki, et al., "High-Speed Scanning Circuit and Device Using This Circuit".

Electronique Applications No. 15, 1980, Paris, France, pp. 83-87, IM-Saroeum, Paindavoine, et al. "Base de Temps Programmable au Standard T.V. Pour Camera C.C.D.".

Primary Examiner—Howard M. Britton
Attorney, Agent, or Firm—Oblon, Spivak, McClelland, Maier & Neustadt

[57] ABSTRACT

This invention provides a multi-standard observation camera fitted with a detector which comprises photosensitive elements arranged in two aligned and/or offset rows, a clock sequencer (22) placed in the same plane as the detector (20), this clock sequencer (22) being used to control the transfer of charges from the sensors into a CCD read circuit (24) to output a video signal compatible with the display monitor television standard. The clock sequencer (22) includes programmable counting resources which define the periods during which the charges are integrated and times at which they are transferred into the read circuit (24), these counting resources being programmed via a link (28) to a memory (25) containing the data required to define several standards. The memory (25) is part of a set of proximity electronics (26) and is controlled by a selection command (27) to match the monitor standard.

8 Claims, 9 Drawing Sheets

MULTI-STANDARD OBSERVATION CAMERA AND A SURVEILLANCE SYSTEM USING THE CAMERA

BACKGROUND OF THE INVENTION

The invention applies to the acquisition of images, particularly in the infrared range and, more precisely to observation cameras designed to output a video signal to a display monitor to form images complying with the standard used in the monitor.

The invention provides a multi-standard observation camera whose output video signal can be adapted to several television standards.

More specifically, but not exclusively, the invention applies to thermal cameras and can be used in panoramic or sectorial surveillance systems.

To convert the light flux received from a scene observed into a video signal, thermal cameras conventionally include a detector, placed in a cryostat, the detector consisting principally of a large number of sensor elements; the sensor elements are sensitive to a specified infrared spectrum band and capable of outputting a quantity of charges proportional to the illumination applied to them. The charges output are transmitted to a processing and multiplexing circuit; charge transfers in such a circuit are triggered by pulses generated by a clock sequencer adjusted to form video signals complying with the standard used in the display monitor.

The sensor elements are placed horizontally relative to the final image formed from the video signals output by the camera and displayed on the monitor.

In general, the sensor elements are arranged in several rows parallel to the same horizontal direction and the detector is used in conjunction with an optomechanical system which projects and vertically scans an image of the scene projected onto the detector. The detector then analyzes the scene using the same line or frame pattern as the image displayed on the monitor, the geometry of the lines being fixed by the display standard.

The layout of the sensor elements in several rows is designed to meet several objectives:
  to provide an adequate number of sensors within a given detector length, for example 6.33 mm;
  to comply with Shannon's sampling theory concerning signal sampling frequency; this implies the detection zones must overlap;
  to increase the detector sensitivity by summing, with a delay and using a method known to the prior art, signals originating from different detection zones but corresponding to the same image point in the scene observed successively.

Conventionally, two types of row layout are used independently:
  to comply with the sampling theory, the rows are horizontally offset by one half of the size of a sensor along this same direction; the output signals are then resynchronized in the processing circuits, in synchronization with the vertical scan and with partial overlapping of luminance signals;
  to improve sensitivity, each row is repeated several times with no horizontal offset; the processing circuit sums signals from corresponding sensors, lying on the same vertical line due to the vertical scan, and corresponding to the same image point, synchronously with the scan, using a mode known to the prior art and referred to as "Time Delay and Integration" or by its abbreviation TDI.

The problem is to design an image acquisition system which simultaneously satisfies the sampling and sensitivity requirements mentioned to produce a high-quality image which can be adapted to several television standards.

However, the first two requirements (sampling and sensitivity) require the use of a relatively large number of rows while the third requirement (adaptability to several television standards) means that the charge transfers are triggered independently for each row and must be different for each standard; this in turn implies generating a corresponding number of clock signals. These signals are generated by "proximity electronics" outside the cryostat and the number of connections outside the cryostat, proportional to the number of rows, will therefore be very high, leading to serious connection capacity and thermal linkage problems.

Consequently, up to the present time, the layout of sensors in offset or aligned sub-rows was compatible with only one standard and only one layout of rows, to the exclusion of any other: conventionally, compatibility with a standard is ensured by adjusting the pitch between rows to an integer sub-multiple of the pitch between the image or frame lines in the television standard in question; it then becomes possible to use only one type of sensor layout with a limited number of rows to limit the connection problems.

For example, SOFRADIR have developed a 228×4 sensor strip. This strip is used with a horizontal scan device since television standards are not quantitatively specified in this direction.

SUMMARY OF THE INVENTION

To provide a camera capable of providing a high-quality image and being adaptable to the main television standards while avoiding the delicate connection problems mentioned above, it is proposed to temporally manage the various pulses which control integration and transfer of the charges from the sensors using counting circuits located in the cryostat; these circuits can be externally programmed to match the characteristics of a selected standard and can be combined to match the organization of the sensor sub-rows to simplify control of all charge transfers.

More particularly, the invention provides a multi-standard observation camera comprising:
  a detector of a given length, sensitive to a given spectrum band and consisting of sensors arranged in rows over the length of the detector, all in the same horizontal direction, to form a given type of structure,
  an optomechanical projection and scan system to project an image of the scene observed, the width of the image being virtually equal to the length of the detector, onto a focal plane coinciding with the detector plane and to sweep this image vertically over the detector,
  a cryostat containing the detector and, connected to the detector, a read circuit which uses the charges the sensors output, proportional to the illumination they receive, after transfer and multiplexing under the control of a clock sequencer synchronized with the vertical scan, to output a video signal to a display monitor complying with a given television standard, this standard being defined by a line frequency and, in the case of digital TV, by a sampling frequency characteristic of the images displayed:

wherein the clock sequencer is placed in the cryostat and includes time counting resources to define the charge integration periods and the instants at which these charges are transferred and multiplexed after integration in the read circuit and wherein these counting resources are preset by a memory outside the cryostat, this memory containing instructions to synchronize the integration period and the transfer and multiplexing instants with the line frequency for one television standard chosen from several standards preselected in the memory, the said television standard corresponding to that of the display monitor.

The camera according to the invention can adapt to several television standards still using the same detector. Moreover, the pitch between the sub-rows of sensors in the detector no longer depends on the pitch between the television lines. It then becomes possible to select the pitch between rows to best meet technological requirements so that the connections between the detector and the proximity electronics can be simplified.

In one embodiment, the programmable counting resources include clock cycle counters which define the integration periods, coupled to other counters to define the transfer instants, the cycles being calculated from the sampling frequency and the counter triggers being synchronized with the monitor line frequency.

In another embodiment, the counting resources consist of accumulation memories, also known as "First In, First Out" or FIFO memories. According to the invention, the counting resources will accept programming instructions at any time to adapt to the standard selected by the operator, for example each time the camera is switched on.

The camera according to the invention can advantageously be used in a sectorial or panoramic surveillance system.

BRIEF DESCRIPTION OF THE DRAWINGS

Other advantages will become clear upon reading the following description and referring to the appended figures of which.

DESCRIPTION OF THE PREFERRED EMBODIMENT

Figure 1:
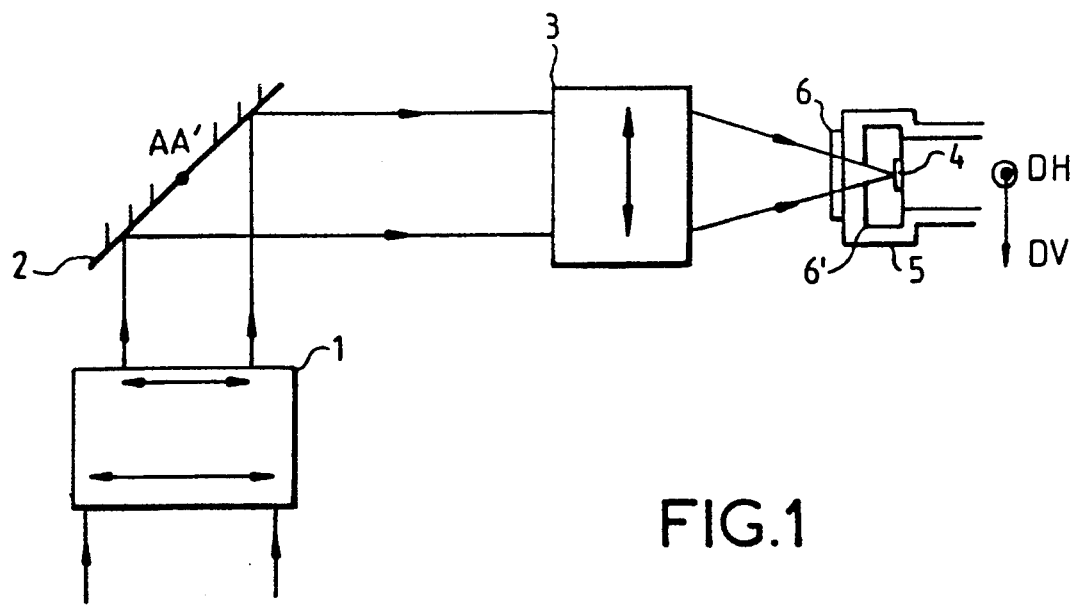
FIG. 1 schematically represents the structure of a thermal observation camera.

Generally, thermal cameras operate in either the 8 to 12 mm or 3 to 5 mm spectrum band, corresponding to the detector sensitive band; the detector is a vertically-scanned strip. FIG. 1 schematically represents the structure of such a camera. On this figure, in the direction in which light propagates, the camera basically comprises an afocal inlet optical system 1 whose magnifying factor is adapted to the required field of view, a vertical scanning mirror 2, a focussing optical system 3 and a photosensitive strip 4 enclosed in a cooled cryostatic chamber 5. The cryostatic chamber is closed by a window 6 which is transparent to infrared radiation in the band considered; the detector field of view is limited by a cold diaphragm 6', still known as a "cold screen", lying inside the cryostat.

The afocal inlet system 1 focuses a light beam from the scene observed at infinity. The beam is then reflected by mirror 2 and then projected onto strip 4 by focussing system 3 to form an image I of the scene observed on the detector strip. The cold screen 6' can coincide with the focussing system 3 outlet diaphragm to eliminate interference introduced by the structure.

The vertically scanned detector is referred to as a "detector strip" because its length is far greater than its height. Conventionally, it comprises a large number of photocells or photoconductive sensor elements arranged into one or several rows, the overall length of the rows dictating the length of the strip. For example, sensors for the 8–12 mm spectrum band can be HgCdTe (mercury-cadmium-tellurium) photodiodes measuring 25×25 mm, deposited, by hybrid techniques, onto a silicon substrate.

When the associated vertical scan mirror, for example mirror 2, oscillates about a horizontal axis AA', the image, of height h, formed by focussing system 3 is analyzed, line by line, on strip 4 as it moves vertically along direction DV; the width of this image, in direction DH perpendicular to the plane of FIG. 1, is the length L of detector 4.

To generate a video signal representative of the scene observed line by line, the sensor elements output charges, proportional to the illumination received by each over a given period of time, these charges being processed in a read circuit which includes shift registers to integrate, transfer and multiplex them; such a charge-coupled device (CCD) or a CMOS device is connected to an output register to generate, after amplification, the video signal.

To meet the sampling and sensitivity requirements expressed above, the sensors in the detector strips are arranged into several rows, this arrangement defining the structure of the said detector. For such structures, various clock commands must be generated to integrate, transfer and multiplex the charges for each row.

Figure 2:
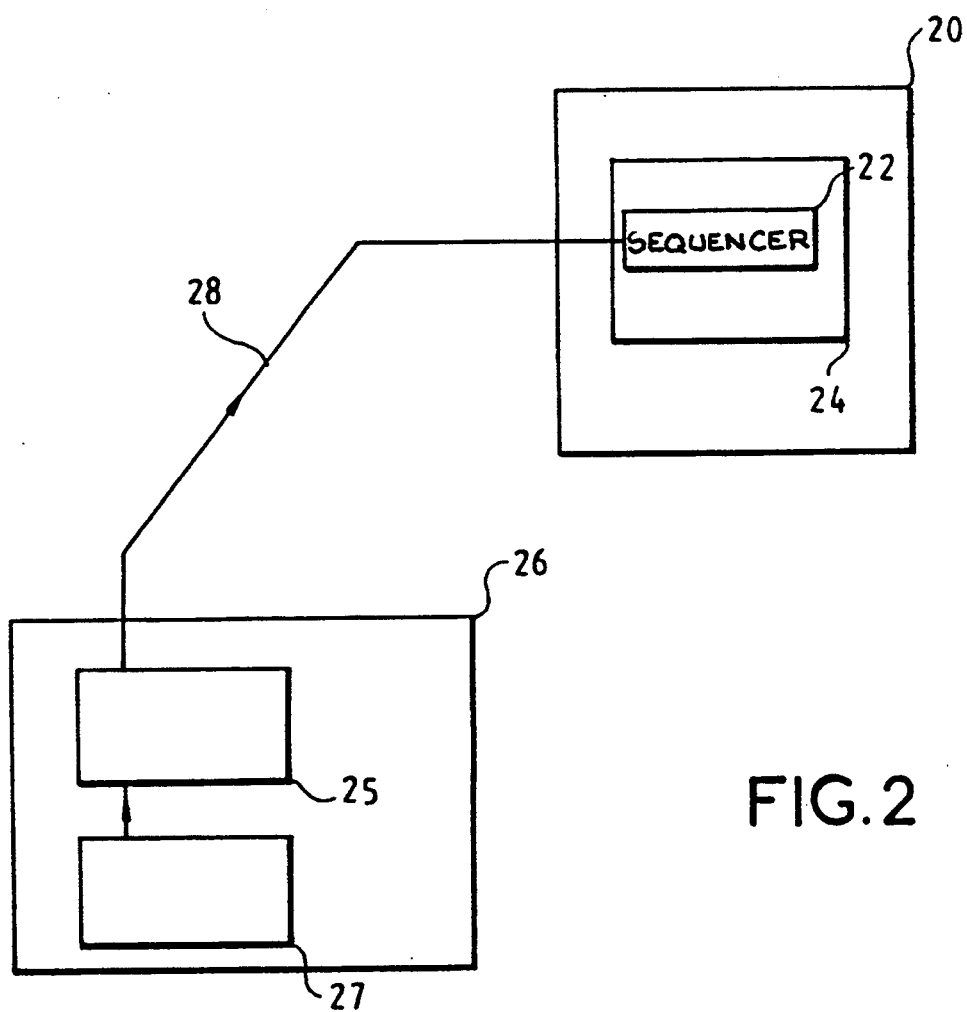
FIG. 2 is a block diagram representing the arrangement of certain hardware components in a structure according to the invention.

FIG. 2 represents a layout of the various hardware components in a camera according to the invention, capable of generating such commands. The various clock command signals are generated in the detector plane 20, which coincides with the focal plane of the optical focussing system 3, by a sequencer 22 which includes time counter resources which can be integrated into the detector 24 read circuit and which can be preset from outside the cryostat, using line and sampling frequency synchronization signals corresponding to a selected television standard and output by an external memory 25. Generating the clock command signals inside the cryostat also reduces the electrical noise in signals and thus allows more reliable control.

A set of proximity electronics 26 includes memory 25 and a command 27 to select instructions in memory 25. Command 27, remotely entered via a switch (not represented) adapts the charge integration periods and transfer and multiplexing instants, imposed by a read circuit for a detector with a given structure, to the required display standard. The device according to the invention guarantees this compatibility regardless of how the rows of sensor elements are organized based on one of the two main types of organization described below and employing either the conventional sampling method involving an offset between the rows (the offset organization) or the TDI mode involving repetition of rows with no offset (the "aligned" layout).

In these organizations, it is preferable to use a large number of sensor rows for the reasons explained above and, because each row has its own integration period and its own instants for transfer of charges between the various read register capacitors, a very large number of clock signals is required to adjust the timing. Moreover, when the detector is designed for multi-standard use, which is the objective of this invention, this high number of signals must be multiplied by the number of standards possible. The invention allows this large number of clock signals to be managed inside the cryostat whereas it would be impossible to inject all these signals from outside the cryostat.

The presetting instruction, concerning the line synchronization and sampling frequency for a standard selected by command 27, for example 1 of the 4 standards described below, are transmitted, for example each time the camera is switched on, from memory 25 via a suitable link 28 to counting resources programmed to comply with these instructions. The charge integration and intermediate storage period, expressed as a number of cycles, are set by the sampling frequency while the integration and transfer instants are adjusted by the line synchronization. An initial set of counters 231 outputs integration command pulses and a second set of counters 232, adjusted to match the charge integration period, outputs transfer command pulses at the end of each charge integration period.

An example of a camera embodying the invention includes a detector whose structure is as described below: it includes, firstly, a photosensitive section comprising rows of sensors arranged into two offset groups (or blocks), each containing 3 aligned rows of 256 sensors and, thus, combining the two main types of organization and, secondly, a processing section containing, in particular, charge integration and intermediate storage capacitors, coupled to timers. These timers are adapted, firstly, to the integration and intermediate storage resources and, secondly, to the TV selected by adjusting the integration periods and transfer instants using programming instructions described in greater detail below.

In hybrid technology, photosensitive sensors, produced from a material such as Cd—Hg—Te, are produced, by hybrid techniques, on a silicon substrate which includes charge integration wells or capacitors, intermediate storage wells or capacitors and multiplexing circuits, connected by charge-transfer lines produced by, for example, from microsolder wires or indium beads. If monolithic technology is used, the sensors, integration or storage wells or capacitors and multiplexing circuits are integrated into the same substrate; the capacitors or storage wells then form stages in the read registers, the signals being read by transferring charges from one well to another.

Figure 3:
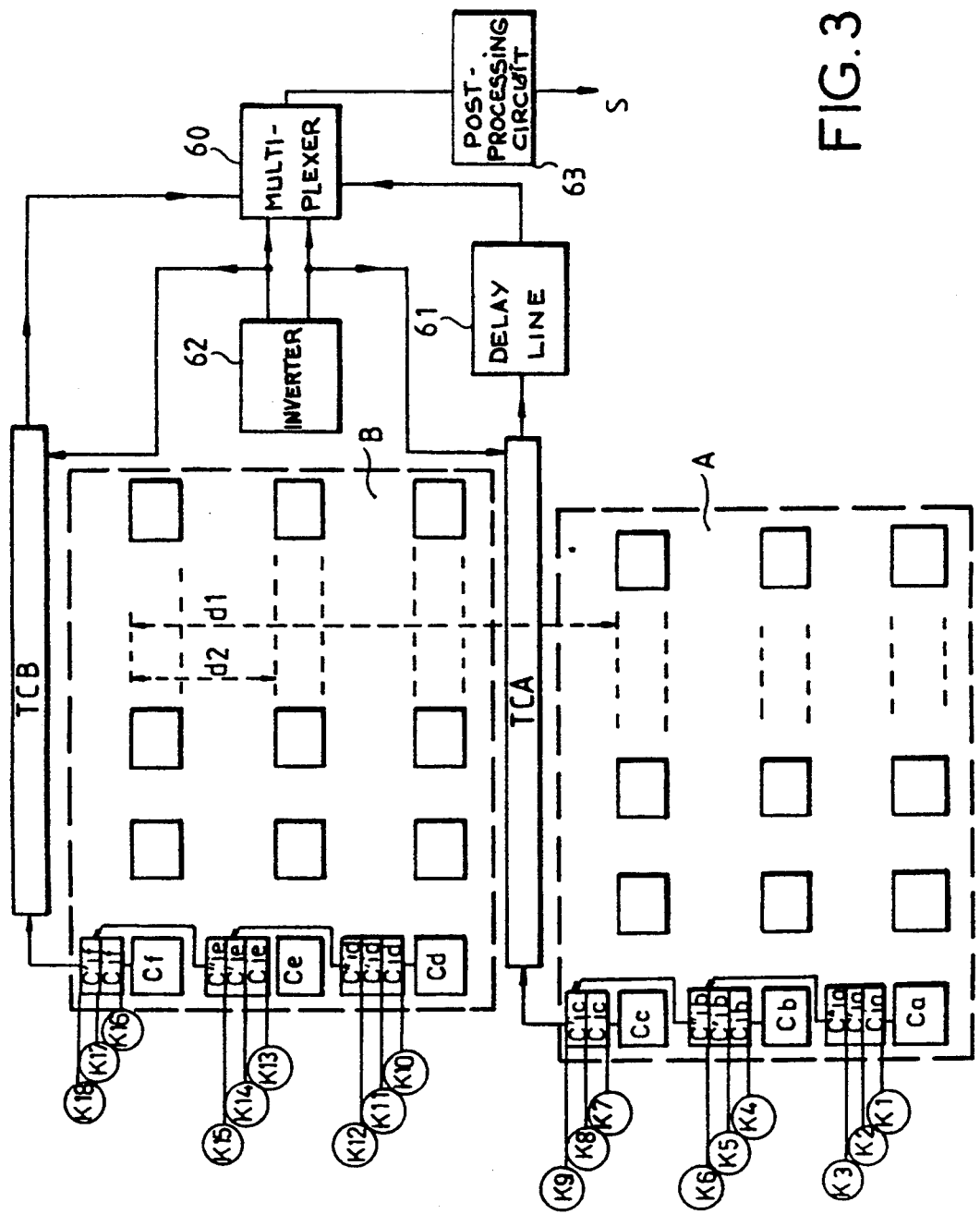
FIG. 3 represents an example of the layout of sensors combining two different types of organization.

FIG. 3 schematically represents the layout of sensors and the integration and storage capacitors associated with these sensors in the example of an embodiment. The layout is only partially represented to make the figure clearer; in particular, only the storage capacitors for the first sensors in rows are shown.

The sensors form two blocks, A and B, offset by a distance equal to the length of a sensor in the horizontal direction of the rows; each block comprises 3 aligned rows, each with 256 sensors. The sensors, measuring 25 $\mu m \times 25$ $\mu m$, form 512 vertical columns of 3 sensors offset by 25 $\mu m$, making the detector 12.8 mm long and meaning the image projected onto the detector must also be 12.8 mm long.

The pitch d2 of non-offset (aligned) rows within a given block is 62.5 $\mu m$ and the pitch d1 between offset blocks is 175 $\mu m$.

Within each block, charges are stored and transferred in the TDI mode, the charges from the sensors in a given column being summed, as described previously, in synchronization with the image line scan over the detector. The charges are summed in intermediate capacitors. In FIG. 3, each first sensor in a row, i.e. Ca, Cb or Cc for block A and Cd, Ce or Cf for block B, is connected to a charge integration capacitor, i.e. Cia, Cib, Cic, Cid, Cie or Cif respectively. Each integration capacitor Cia to Cif is coupled to 2 successive intermediate capacitors, i.e. C'ia and C"ia connected respectively to $C_{ia}$, $C'_{ib}$ and $C''_{ib}$ to $C_{ib}$, $C'_{ic}$ to $C'_{if}$ to $C_{if}$. The function and number of these intermediate capacitors is described later.

The charges output by the sensors are stored in the integration capacitors and then transferred successively into the intermediate capacitors. At the output from the last intermediate capacitor, the charges from a sensor are added to those stored in the intermediate capacitors for the next higher sensor in the same column, these sensors having received the same luminous flux in line with the TDI principle. Consequently, on FIG. 3, capacitor $C''_{ia}$ is connected to capacitor $C'_{ib}$, capacitor $C''_{ib}$ to capacitor $C'_{ic}$, capacitor $C''_{id}$ to capacitor $C'_{ie}$ and capacitor $C''_{ie}$ to capacitor $C'_{if}$.

The rows in a given block operating in the TDI mode are equivalent to a single "master row" as described below. The two offset master rows thus formed operate in an "offset" mode which involves, as described below, using delay lines to synchronize the signals output by sensors to produce a video sequence. Similarly, the signals originating from a given column of sensors, in the example of an embodiment illustrated in FIG. 3, are transmitted to a block charge transfer register, TCA for block A and TCB for block B, and then synchronized by a delay line. To this end, the outputs from registers TCA and TCB are connected to a multiplexer 60 via a delay line (61 for the TCA output). The multiplexer and the outputs from registers TCA and TCB are controlled by an inverter 62 whose switching rate is adjusted by the sampling frequency. Inverter 62 allows the TCA and TCB circuit outputs to be alternately synchronized to a frequency equal to the sampling frequency. The signal output by multiplexer 60 is amplified and filtered by a post-processing circuit 63 to form output signal S.

To temporally manage this detector, it is first necessary to define, in time, the sequence of integration periods and instants at which charges are transferred into the capacitors; this sequence is controlled by the counter resources and must match the characteristics of the standard selected.

In the example in FIG. 3, limited to the first sensors in the rows, these commands are referred to as K1 to K18. To facilitate the period counts, it is important to differentiate between two types of command: those which control the sensor $C_a$ to $C_f$ charge integration periods in integration capacitors $C_{ia}$ to $C_{if}$, i.e. commands K1, K4, K7, K10, K13 and K16 respectively, and those which control the instants at which transfers between intermediate capacitors $C_{ia}$ and $C'_{ia}$, $C'_{ia}$ and $C''_{ia}$, $C_{ib}$ and $C'_{ib}$, $C'_{ib}$ and $C''_{ib}$, $C_{ic}$ and $C'_{ic}$, $C'_{ic}$ and $C''_{ic}$, $C_{id}$ and $C'_{id}$, $C'_{id}$ and $C''_{id}$, $C_{ie}$ and $C'_{ie}$, $C'_{ie}$ and $C''_{ie}$, $C_{if}$ and $C'_{if}$, controlled respectively by commands K2, K3, K5, K6, K8, K9, K11, K12, K14, K15 and K17 are performed. Certain commands must manage simultaneous transfers to sum the charges in line with TDI principles: this applies to commands K5, K8, K14 and K17 which, in addition to the transfer times already indicated, also adjust transfer times between $C''_{ia}$ and $C'_{ib}$, $C''_{ib}$ and $C'_{ic}$, $C''_{id}$ and $C'_{ie}$ and $C'_{ie}$ and $C'_{if}$ respectively.

Finally, commands also control the instants of transfer from the intermediate capacitors to transfer registers TCA and TCB: K9 between $C'_{ic}$ and TCA and K18 between $C'_{if}$ and TCB.

In this example of an embodiment, commands K1 to K18 are, obviously, repeated 256 times to control the transfers for the 256 columns in the detector.

To adapt to the selected television standard implies imposing integration times and charge transfer instants in the various commands K1 to K18 repeated 256 times. As an example, the timing diagrams in 4a and 4b show the timing values for the 625-line CCIR and 525-line US standards respectively.

For either of the standards, commands K1, K4, K7, K10, K13 and K16 effectively integrate the charges over periods of approx 60 μs, corresponding to the high level of the command signals shown in the timing diagrams, these periods being separated by a 4 μs reset represented by the low level. The charge transfers between interconnected intermediate capacitors are controlled, at the rate of 64 μs for the CCIR standard and 63.49 μs for the US standard, by the other commands K2, K3, K5, K6, K8, K9, K11, K12, K14, K15, K17 and K18. For example, lines designated L and L' in FIGS. 4a and 4b indicate the successive transmission of charges originating from sensor $C_a$; these lines show, firstly, a series of levels which represent the storage times in capacitors $C_{ia}$, $C'_{ia}$, $C''_{ia}$, $C'_{ib}$, $C''_{ib}$ and $C'_{ic}$ respectively and, secondly, the negative-going edges which correspond to the instants the charges are transferred from one capacitor to the other. As can be seen by comparing the corresponding timing diagrams, the instants at which charge integration begins in the integration capacities, triggered by K4, K7, K10 and K16, are offset between the two standards. This offset arises from the different scan speeds used in the two standards. The values of these speeds are detailed below.

Figure 4:
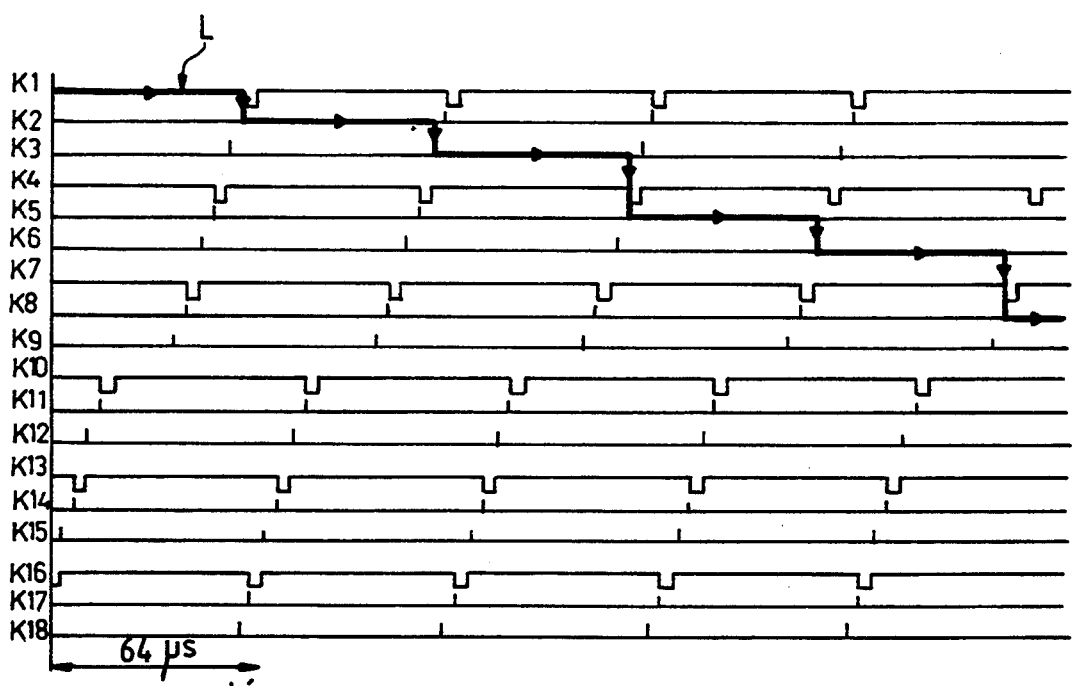
FIGS. 4a and 4b are two timing diagrams showing the periods and instants of integration and transfer of the charges, corresponding to the previous example of an embodiment suitable for two television standards.

The number of intermediate capacitors required and, therefore, the number of intermediate commands and the values of the time-shift between the various charge storage periods for each sensor, as shown in FIGS. 4a and 4b, together with the delay between blocks A and B introduced by delay line 61, must be calculated, depending on the characteristics of the standard, in the same way as for detectors comprising rows of aligned sensors as far as the calculations for a given block are concerned and in the same way as for a detector with offset rows as far as the calculation of the delay between blocks in concerned. These calculations are justified later.

As an example, the calculation of the number of intermediate capacitors, the value of the time shift between sensors and the delay between blocks resulting from the basic characteristics, i.e. image height, distance between frame lines, and TV line period, for the two standards mentioned earlier, i.e. the CCIR 625-line and US 525-line standards are summarized in table I below.

TABLE I

| STANDARD | CCIR 625 line | US 525 line |
|---|---|---|
| h = image height (L4/3 format) | 9.6 mm for a 12.8 mm-wide image | |
| u = number of useful lines | 575 | 485 |
| Distance between lines in a frame (mm) f = 2 × h/u | 33.39 | 39.6 |
| p = TV line period (mm) Scan speed (m/s) | 64 | 63.49 |
| v = f/P | 0.522 | 0.624 |
| d2 = row pitch (μm) | 62.5 | |
| Time shift between sensors (d2/v) (μs) | 119.73 | 100.16 |
| Number of intermediate capacitors (d2/f) | 2 | 2 |
| d1 = block pitch (μm) | 175 | |
| Delay between blocks (d1/v) (μs) | 335.25 | 280.45 |

The start of integration and transfer instants transmitted to the sensors, capacitors and delay lines in the commands used in a multi-standard camera detector according to the invention, for example in commands K1 to K18 mentioned in the previous examples, are generated by a sequencer, including counting resources, in the detector plane.

In one embodiment, these counting resources consist of a first series of counters preset to match the characteristics of the selected TV standard, i.e. the sampling frequency and line synchronization, to generate the commands for the corresponding first integration capacitors. The outputs from the first series of counters are connected to a second series of counters which can be adjusted to match the period over which the charges in the integration capacitors are integrated.

The periods are counted as a number of clock cycles based on the value of the sampling frequency.

Figure 5:
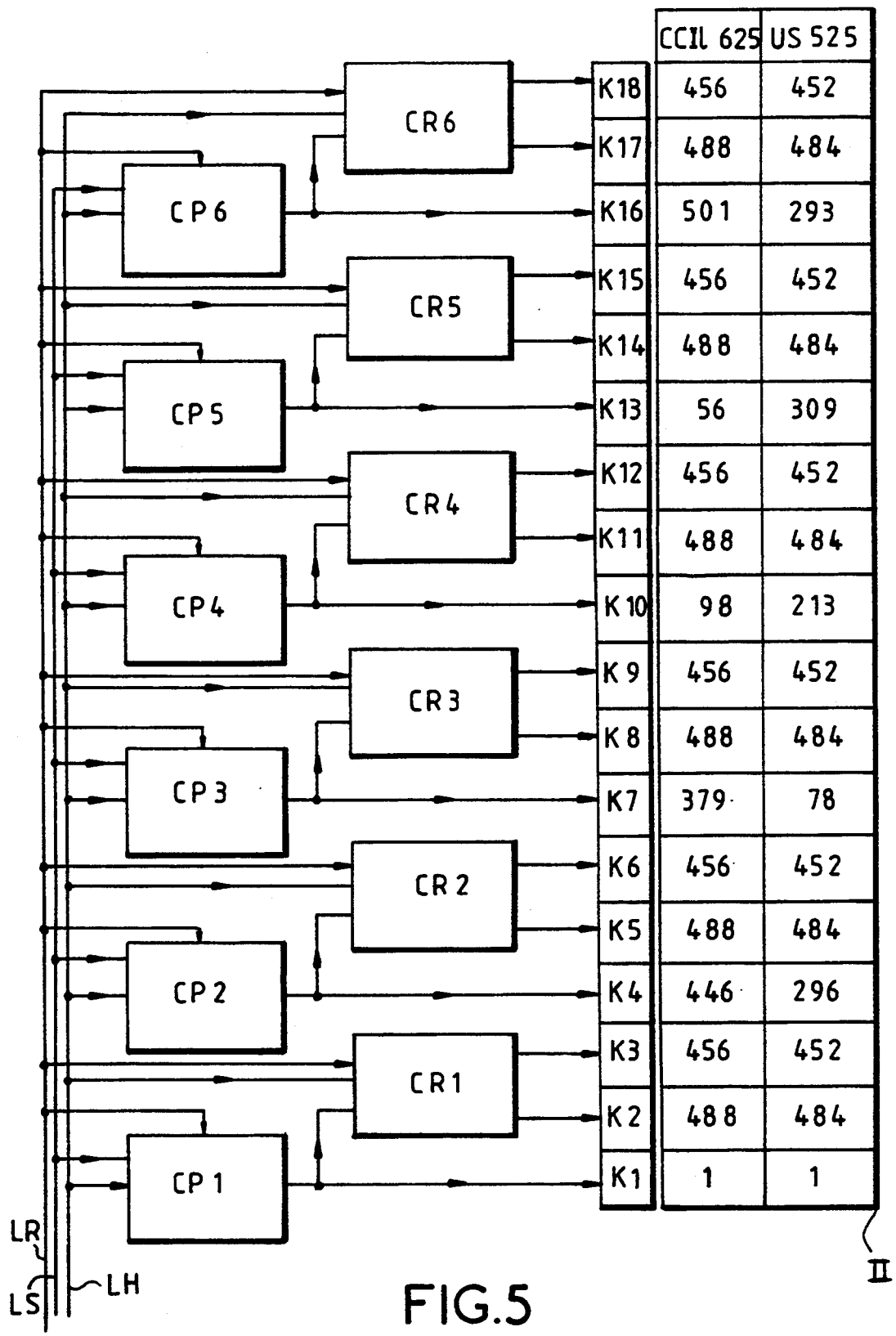
FIG. 5 represents an embodiment of a programmable counter sequencer.

For example, FIG. 5 shows a basic structure consisting of programmable, adjustable counters which use a 8 MHz clock to generate commands K1 to K18 for the first two columns of sensors in the detector shown in FIG. 3. Obviously, to manage the complete detector, this basic structure must be repeated 256 times. It comprises 6 first-stage programmable counters CP1 to CP6 whose outputs are connected respectively to the inputs to 6 other adjustable counters CR1 to CR6. The count adjustment instructions are received from the outside memory (not shown in FIG. 5) and correspond to the characteristics of the standard selected; they are fed to the counters by a line LR which is part of a bus line. The line synchronization pulses and clock signals defining the count frequency are input to counters CP1 to CP6 via lines LS and LH in the same bus. The second series of counters, CR1 to CR6, are connected to lines LR and LH to read the charge integration period for the standard selected. The counting of clock cycles by counters CP1 to CP6 is controlled by line synchronization pulses, corresponding to the scan speed, received over LS while the counting of clock cycles by counters CR1 to CR6 is triggered by pulses output by counters CP1 to CP6.

As an example, for sampling clock frequencies which give 8 (i.e. 8 MHz clock) or 8.064 samples per microsecond, corresponding respectively to the CCIR 625-line and US 525-line standards, the number of clock cycles counted by each counter to generate commands K1 to K18 and controlled by the count adjustment line LR are indicated in table II opposite the commands indicated on FIG. 5. The charge integration and transfer instants are then as shown on the timing diagrams in FIGS. 4a and 4b.

Counters CP1 to CP6 transmit integration commands K1, K4, K7, K10, K13 and K16 on their outputs.

Each counter CR1 to CR6 has two outputs which, respectively, carry transfer commands K3 then K2, K6 then K5, K9 then K8, K12 then K11, K15 then K14 and K18 then K17. Commands K2, K5, K8, K11, K14 and K17 trigger transfer of the charges from the integration capacitors to the first intermediate capacitors, coinciding with the instants at which the charges in the second intermediate capacitors are summed with those in the first intermediate capacitors for the next higher row. Obviously, the coincidence of these instants does not apply to the charges from the first row of sensors in each block. Commands K3, K6, K9, K12, K15 and K18 trigger the transfer of charges from the first intermediate capacitors to the second intermediate capacitors.

The period of the transfer commands is the line period, i.e. 63.49 μs for the US standard and 64 μs for the CCIR standard, the integration period being preset to 60 μs and 59.51 μs for the CCIR 625-line and US-525 line standards respectively. The instants at which charges are transferred between the first and second intermediate capacitors are offset in time by the period required to eliminate the charges from the storage wells, this period conventionally being 4 μs, i.e. 32 clock cycles when the sampling frequency is 8 MHz. This time shift is imposed on the outputs from counters CR1 to CR6 by a delay line integrated into each adjustable counter. The 4-cycle difference between the intermediate capacitor storage periods for the two reference standards arises from the 0.51 μs difference between the line periods and, therefore, integration time.

In another embodiment, the programmable resources consist of accumulation, or first-in first-out (FIFO) memories. The FIFO memories are adjusted to match the standard required and output the integration commands to the integration capacitors. The outputs are coupled to secondary FIFO memories which generate commands to transfer to the intermediate capacitors.

Figure 6:
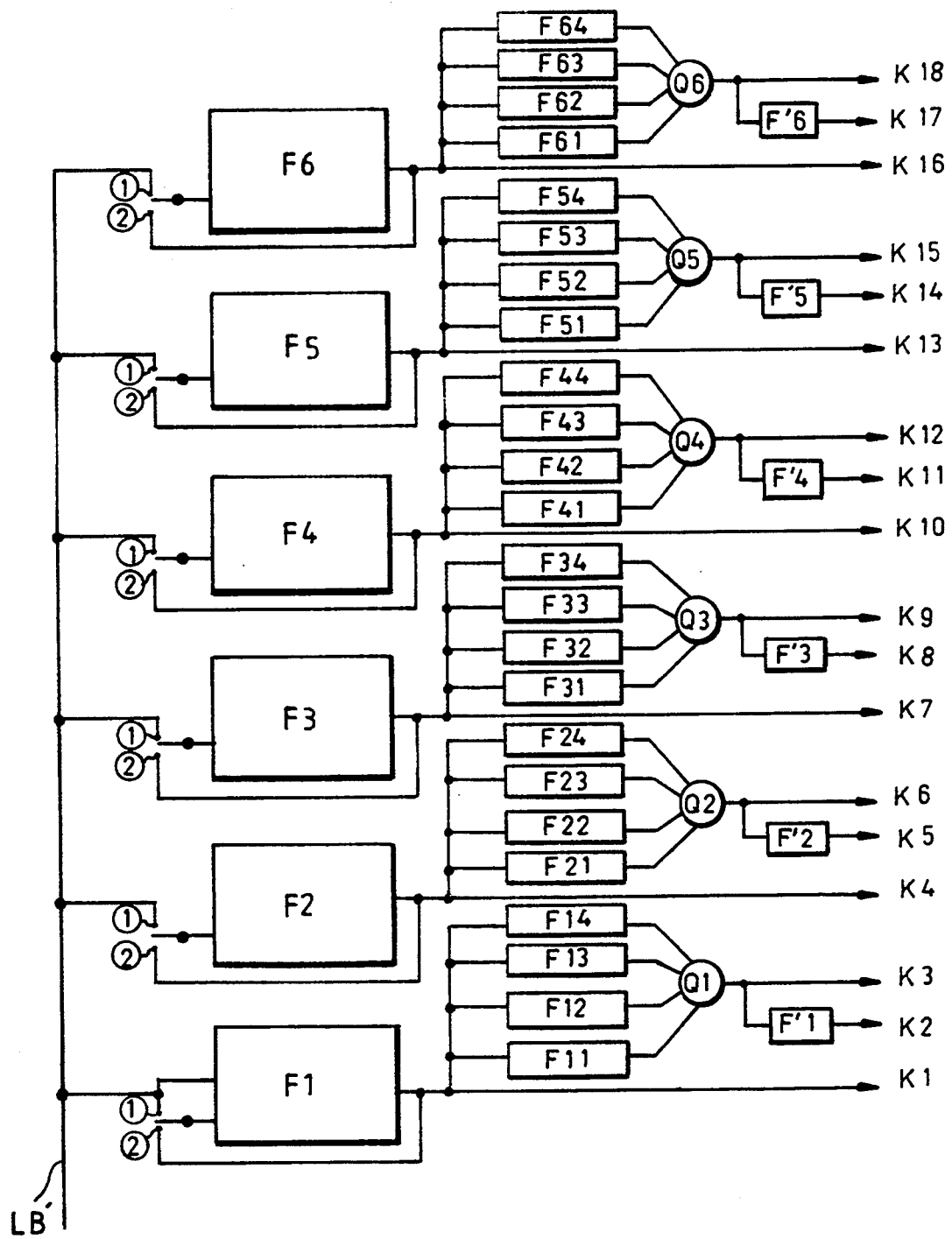
FIG. 6 represents an embodiment of a FIFO memory sequencer.

FIG. 6 represents an embodiment of FIFO memories used as adjustable time counters. The start of integration in the integration capacitors is controlled by the first 6 FIFO memories, i.e. F1 to F6, which are loaded as appropriate to the standard selected when the camera is switched on. During normal operation, an input selector is set to position 2 to form a circular shift loop around the FIFO.

The 6 FIFO output pulses to start integration of charges in the integration capacitors controlled respectively by commands K1, K4, K7, K10, K13 and K16.

Each memory F1 to F6 also transmits its pulses into a group of 4 secondary FIFO memories connected in parallel, $F_{i1}$ to $F_{i4}$, coupled to the output of memory Fi where i varies from 1 to 6. These 6 groups of 4 secondary memories define 4 periods that can be selected by a switch, respectively Q1 to Q6, these times corresponding to the period of integration in the integration capacitors for the standard selected by an external control. The periods counted by the secondary FIFO memories are the times at which charges are transferred from the first to second intermediate capacitors, triggered by commands K3, K6, K9, K12, K15 and K18. A second set of FIFO memories, F'1 to F'6, are triggered approx every 32 clock cycles, this period corresponding to the time required to eliminate the charges from the integration capacitors, to apply a pulse to the output of each switch Q1 to Q6 to mark the end of integration and charge transfer to the first intermediate capacitors. These transfers are controlled in association with commands K2, KS, K8, K11, K14 and K17.

The invention is also applicable when the detector consists of sensors organized in one of the two ways known to the prior art and described previously. The calculation of the integration periods and the instant of charge transfer are explained below, for each case, based on the characteristics of these detector organizations and various television standards.

Figure 7:
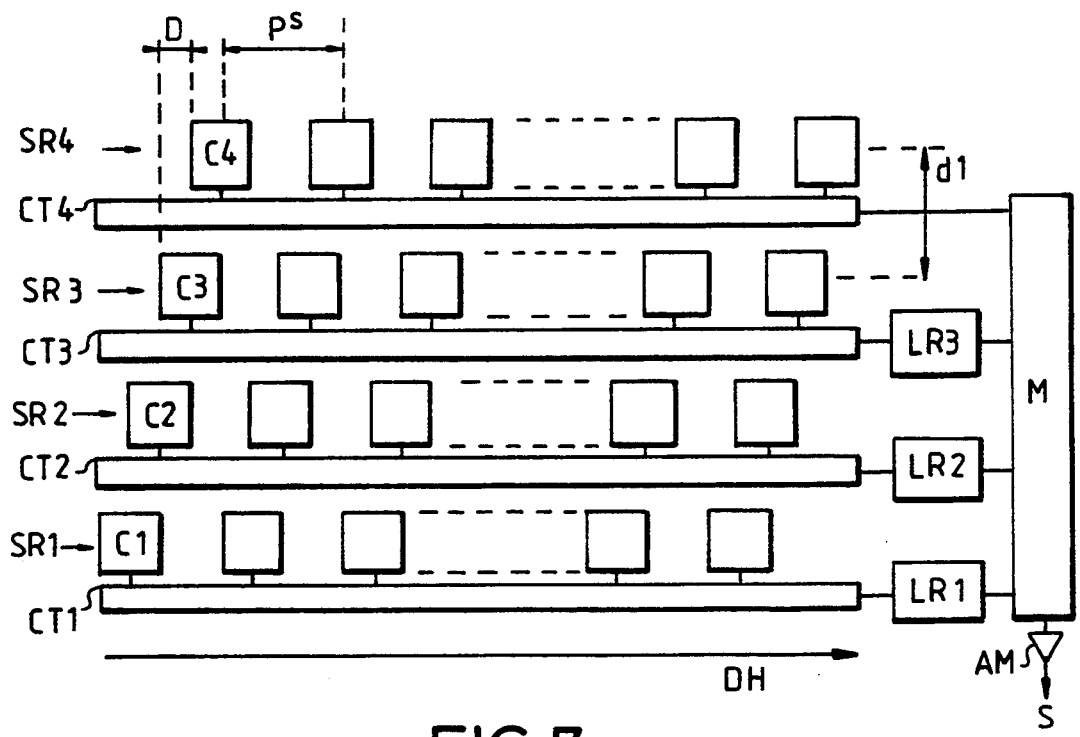
FIGS. 7 and 8 represent two organizations, known to the prior art, of sensor elements in detectors and the associated processing circuits.

FIG. 7 illustrates the "offset" organization: the N sensor elements in a linear strip are arranged in n rows SR1, SR2, SR3, . . . , SRn, each horizontally shifted relative to the following by D, the first sensors in the rows being designated C1, C2, C3, . . . , Cn respectively. In figure 6, n is limited to 4 but its value could be higher. Each row consists of N/n sensors. To satisfy Shannon's sampling theorem, the shift D in sub-row horizontal direction DH is equal to half the length of a sensor in this direction. In this case, the signal sampling frequency is twice the spatial cut-off frequency which depends on the spacing of the sensor elements.

The value of offset D and the number of rows n determine the value of the pitch ps in direction DH between sensors in a given row, where ps is the product of D by n. One further parameter $d_1$, which is the pitch between rows in the vertical direction DV, perpendicular to DH, completes the description of the organization of sensors into offset rows. The sensors in a given row SRi, where i varies from 1 to n, are connected to the inputs to an associated charge transfer register designated CTi. These transfer registers are connected to multiplexer M via delay lines LR1 to LRn−1, i.e. LR1 to LR3 in the example illustrated. The delay lines are connected to the outputs from the transfer registers CT1 to CT3 respectively, no delay being imposed on the output from register CT4.

To reproduce, line by line, the image the focusing system forms on the detector, the charges created by each sensing element in each sub-row SRi are stored, for a period appropriate to the television standard, in an integration capacitor and then in an intermediate capacitor before being transmitted to transfer register CTi associated with the corresponding row SRi. These capacitors (not shown) employ CMOS technology, known to the prior art, whereas CCD technology requires storage wells; the input and outputs flows are controlled by appropriate potential differences.

In a variant, instead of being transferred into a transfer register, the charges are read directly by a multiplexing circuit.

The read or charge-transfer frequency is such that all charges from a given row are read or transferred during the maximum length of an image line. This basic rule, required to adapt to the standard, applies to all sensor organizations.

After multiplexing and transfer into a CTi register, the signals are delayed by the corresponding delay line LRi, the delay being chosen to ensure that all signals corresponding to the same image line are subsequently synchronized. Consequently, the resynchronized signals are finally multiplexed by multiplexer M and amplified by amplifier A to form the video output signal S.

The television standard used by the display monitor dictates the periods for which the charges are stored in the storage capacitors and the delays imposed on the signals in the delay lines. The relationships between these periods and the type of standard used are detailed below.

Figure 8:
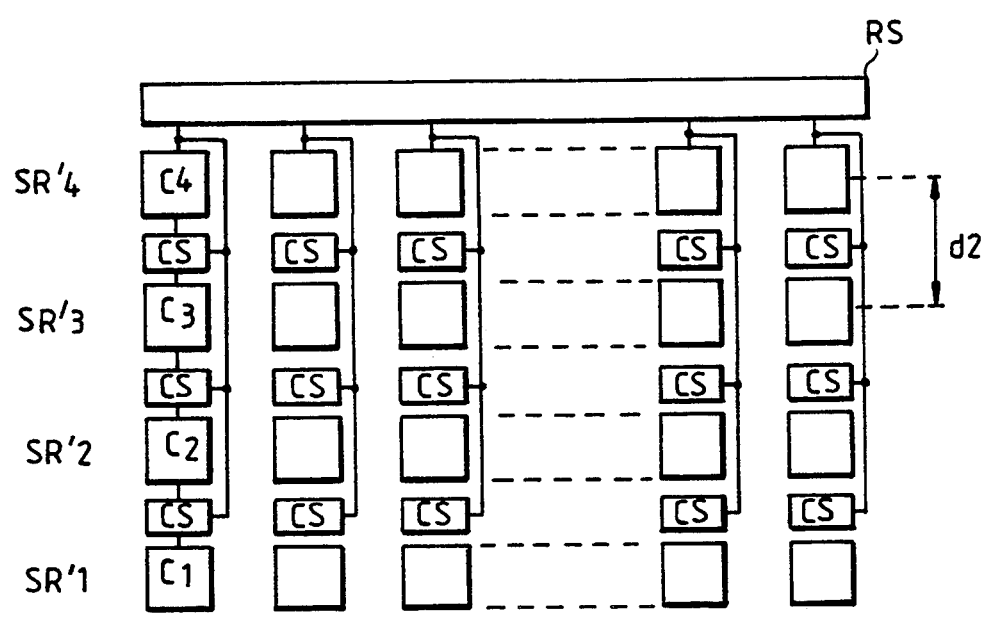
Figure 9:
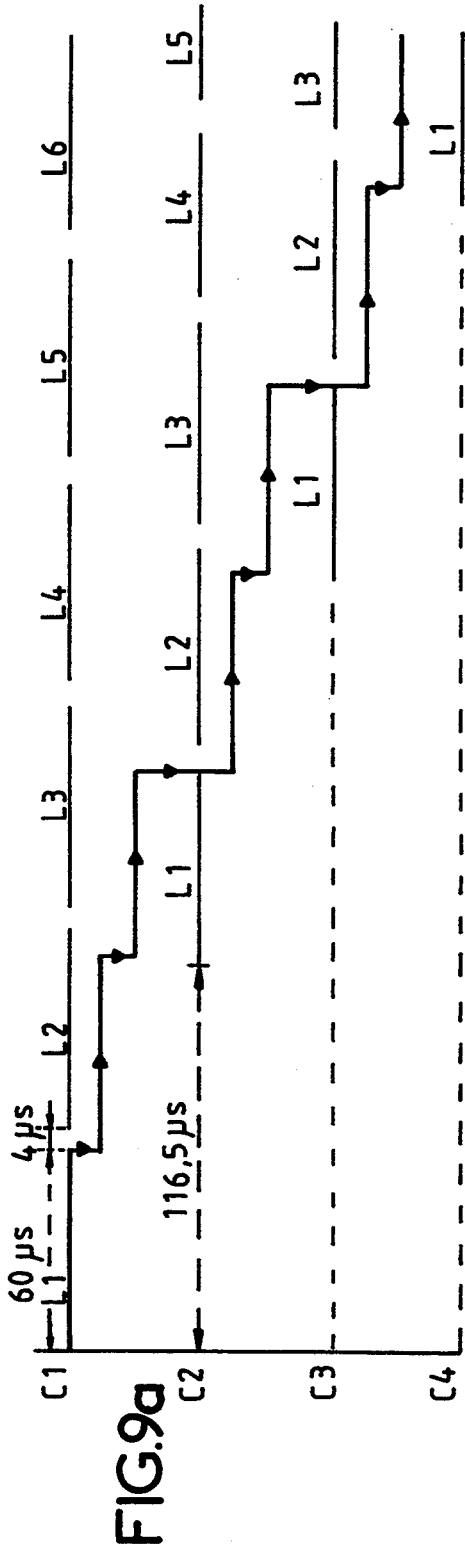
FIGS. 9a to 9d are timing diagrams of the charge integration periods for the first sensors in 4 known television standards.

FIG. 8 represents another organization of sensors and another method of processing signals they output, designed to increase the sensitivity of a detector containing N sensors. In this organization, the N sensors for one image line are split into k rows of N/k sensors SR'1, SR'2, ..., SR'K; k is four in the example illustrated but could be considerably more. Only the first sensors C1, C2, ..., Ck have references in the figure. The rows are aligned repetitively and vertically positioned at pitch D2. The sensors therefore form N/k vertical columns each with k sensors.

To increase the detector sensitivity, sensors in a given column are conventionally connected together by time delay and integration (TDI) circuits which, after a delay, transfer the signals output by each sensor into an output register RS and sums them in synchronization with the line scan.

It is known that, in general terms, signals are summed linearly and noise quadratically: the signal for a given image line is therefore amplified, in this case, by factor k while the noise is only multiplied by $\sqrt{k}$; consequently, the signal-noise ratio and, therefore, the sensitivity is multiplied by $\sqrt{k}$.

In practical terms, the charges output by each sensor in a row SR'j, where j varies from 1 to k, are stored, via the processing circuit, in an integration capacitor and then in the intermediate storage capacitors; the charges contained in the intermediate storage capacities for row SR'j are added to the intermediate capacitor charges corresponding to the same column in sub-row SR'j+1, synchronized by the vertical scan. The storage times in the capacitors are selected to meet this need for synchronization so that the charges transmitted to the output register RS are summed; RS may be a shift read register or a multiplexing circuit.

The output register must output a video signal at a frequency compatible with the television standard used. To ensure this, the periods the charges are stored in the integration capacitors and the intermediate capacitors, and the number of intermediate capacitors, are calculated to comply with the following rule (already mentioned): the charges contained in each capacitor must be transferred before it can be used to store other charges and are, therefore, transferred at the line frequency rate.

The integration capacitor storage timing diagram, for a given standard, is the same for both of the above types of organization. For example, the time for which the charges from the first sensors C1 to Cn or C1 to Ck above are integrated to successively form image lines L1, L2, ..., Lp, are summarized in table II below, assuming k=n and using the following notations: To is the instant at which integration starts, $\Delta Ti$ is the integration time, d is the pitch between rows (d=d1 or d2), f is the pitch between two image lines and v is the image analysis vertical speed:

TABLE II

| Detector | Image line | Integration time |
|---|---|---|
| C1 |  | To, To + $\Delta Ti$ |
| C2 |  | To + d/v, To + d/v + $\Delta Ti$ |
|  | L1 |  |
| Cn |  | To + (n − 1) d/v, To + (n − 1) d/v + $\Delta Ti$ |
| C1 |  | To + f/v, To + f/v + $\Delta Ti$ |
|  | L2 |  |
| Cn |  | To + f/v + (n − 1) d/v, To + f/v + (n − 1) d/v + $\Delta Ti$ |
| C1 |  | To + (p − 1) f/v, To + (p − 1) f/v + $\Delta Ti$ |
|  | Lp |  |
| Cn |  | To + (p − 1) f/v + (n − 1) d/v, To + (p − 1) f/v + (n − 1) d/v + $\Delta Ti$ |

This table shows that the integration times start and end at different instants for different sensors; this means there must be as many clock commands as there are sensors. Consequently, for a given line L1, L2, ..., or Lp, the charges from sensors C1, C2, etc. are integrated in and output by the integration capacitors successively with a time shift of d/v per sensor; equally, for each sensor C1, C2, ..., or Cn, the integration times corresponding to successive image lines L1, L2, ..., Lp start at instants separated by a time f/v subsequently referred to as the "line period".

As an example, the following table III summarizes the values of these parameters for four reference standards, i.e. the 625-line (CCIR), 525-line (US) and 875-line standards and another 525-line standard:

TABLE III

| Standard | 625 (CCIR) | 525 (US) | 875 | 525 |
|---|---|---|---|---|
| Lines per image | 625 | 525 | 875 | 525 |
| Frame frequency (Hz) | 50 | 60 | 60 | 60 |
| Number of useful lines | 575 | 485 | 809 | 485 |
| Integration period Ti (µs) | 60 | 60 | 35 | 60 |

The timing diagrams FIGS. 9a to 9d show, for each of these standards respectively, the timing of the integration periods defined in table I for the first sensors C1 to C4 and are applicable to either of the two types of organization described. The integration periods for each sensor are separated, in time, by f/v and correspond to successive image lines L1, L2, L3, L4, L5, L6, etc.

Timing diagrams 9a to 9d are based on time shifts of d/v and f/v. The time shift (d/v) between integration periods for one sensor and the next in the same image line and the time shift per line for a given sensor (f/v) can be simply calculated from some of the display standard characteristics: the line frequency $F_e$, the image period $T_t$ (or frame period if the image is formed by interlacing two frames using the conventional procedure) and the height h of the 4/3-format image formed by the detector of length L (in the numerical examples, L=15.36 mm and h=11.52 mm; these are the conventional values of a vertical-scan camera developed by TRT using a 4×256 offset sensors in a strip). Consequently, from these characteristics, it is immediately possible to calculate:

distance f between two image lines: $f=h/F_e \times F_t$, $F_{ex}T_t$ being the number of lines in an image (or a frame) equal to $F_e \times T_t$;

the analysis speed: $v=h/T_t$ the time shift per line or line period f/v;

the time shift per sensor d/v;

Table IV shows the numerical value of these characteristics for the various standards illustrated by timing diagrams 9a to 9d:

TABLE IV

| Timing diagram | 9a | 9b | 9c | 9d |
|---|---|---|---|---|
| Standard | CCIR | US | 875 | 525 |
| Inter-line distance f (μm) | 16.5 | 19.5 | 11.7 | 19.5 |
| Analysis speed v (m/Ls) | | | | |
| Distance between sub-rows d (μm) | | | | |
| f/v (μs) | | | | |
| Time shift d/v (μs) | | | | |

At the end of the storage periods in the various integration capacitors, the charges are transferred to the intermediate capacitors. The storage times in the intermediate capacitors must satisfy the rule that these capacitors must be filled to a maximum during the image line period.

To resynchronize signals corresponding to the charges successively released by the integration capacities to the television standard line frequency, the number of intermediate capacitors, and the storage time in them, must be adapted to this standard.

Consequently, the rule mentioned above and the standard determine the number of intermediate stages for a given type of organization:

for a TDI organization, the number of intermediate stages g, i.e. the number of intermediate storage capacitors, is the ratio between the time shift between the instants at which the charges from one sensor and the next in the same line are integrated and the time shift from one image line to the next, rounded up to the next higher integer.

, $g=(d2/v)/(f/v)=d2/f$

For example, for the above standards, 2,2,3 and 1 intermediate capacitors are required for each sensor respectively. The dotted and arrowed line on timing diagram 9a illustrates the successive summing of charges from sensors C1 to C4 to form the start of the first line L1; the horizontal parts represent the time of storage in intermediate capacitors and the vertical parts mark instants of transfer:

for an offset organization as illustrated in FIG. 7, the charges from a given row of N/n sensors are first transmitted via the multiplexing and transfer circuit in the associated processing circuit at a frequency such that all charges from the sensors in a given row are multiplexed and transferred during one image line period.

For example, if the line period is 64 ms and the detector is that already described, containing 704 sensors and being 6.33 mm long, giving 704/4=176 sensors per row, the multiplexing or transfer frequency is 176/64=2.75 MHz and the multiplexing or transfer period is 64/176=0.36 ms. The signals are then delayed, as described previously, in the delay lines LR1 to LR3 before being multiplexed in multiplexer M.

In this example of an offset organization, the number of intermediate stages required affects each delay line. The number of stages is the integer closest to the ratio between the delay line delay, which is the time shift from one sensor to another, and the time to transfer into the multiplexing or transfer circuit.

Consequently, in the above example, applied to the 625-line CCIR standard whose timing diagram is given in FIG. 4a, the delays for lines LR1 to LR3 are respectively 349.5 ms, 233 ms and 116.5 ms and 960 stages are required, 640 plus 320, to obtain a transfer time of 0.36 ms.

It should be noted that a variant of the read circuit, similar to the delay and multiplexing structure described for a TDI organization, could also be used to delay and multiplex the charges from a set of sensors in an offset organization.

Figure 10:
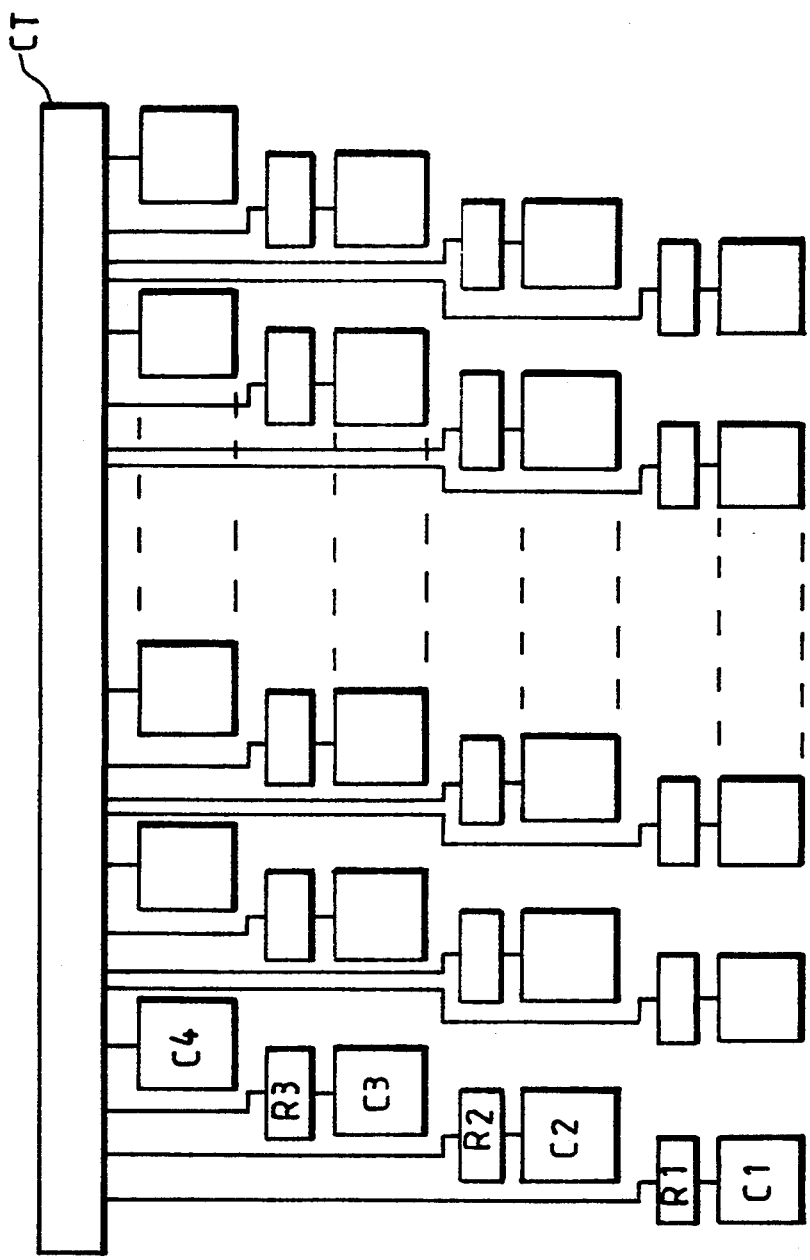
FIG. 10 is a variant of the processing circuit for charges generated by sensors organized into offset sub-rows.

Such a structure is illustrated in FIG. 10 and contains a single transfer circuit CT, connected to all sensors such as C1, C2, C3 and C4, via delay circuits, for example R1, R2 and R3 for sensors C1 to C3, which respectively introduce the same delays as the delay lines described above, i.e. for the 625-line CCIR standard, delays of 349.5 μs, 233 μs and 116.5 μs. The number of stages required in delay circuits is the integer closest to the ratio between the delay period and the line period and is the same for all delay circuits connected to a given row of sensors. For example, for the 625-line CCIR standard, the number is 6, 4 and 2 respectively for rows SR1 to SR3 with a line period of 64 ms.

The only difference between this last example of a read circuit structure, used to delay the charges from a detector comprising offset rows, and a TDI management structure is that the number of intermediate capacitors varies from row to row.

The invention is not only applicable to sensors in offset or aligned (i.e. with no offset) rows and, in particular, to a larger number of rows than 4 but also, in more general terms, to a detector containing sensors combined into any of the above two types of organization to obtain the advantages of each.

Figure 11B:
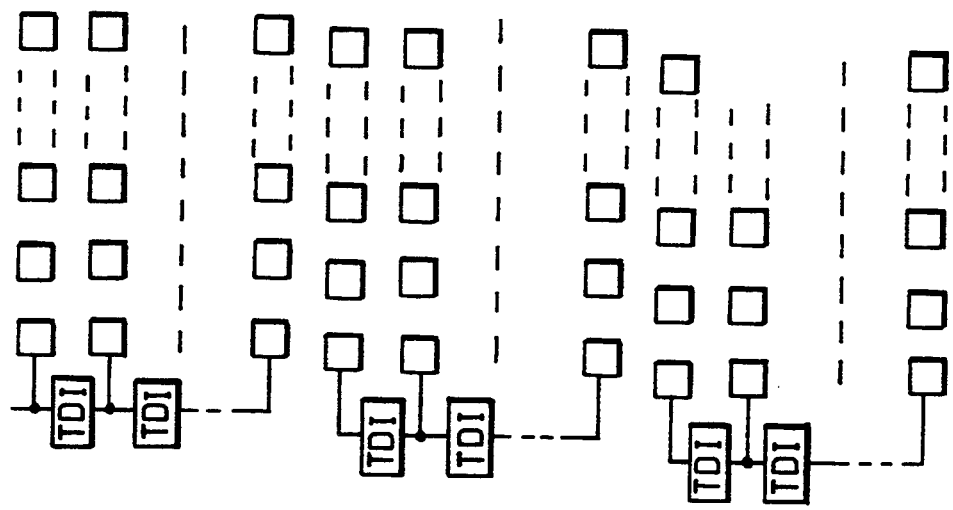
FIGS. 11a and 11b represent two combined organizations of sensor rows.
Figure 11A:
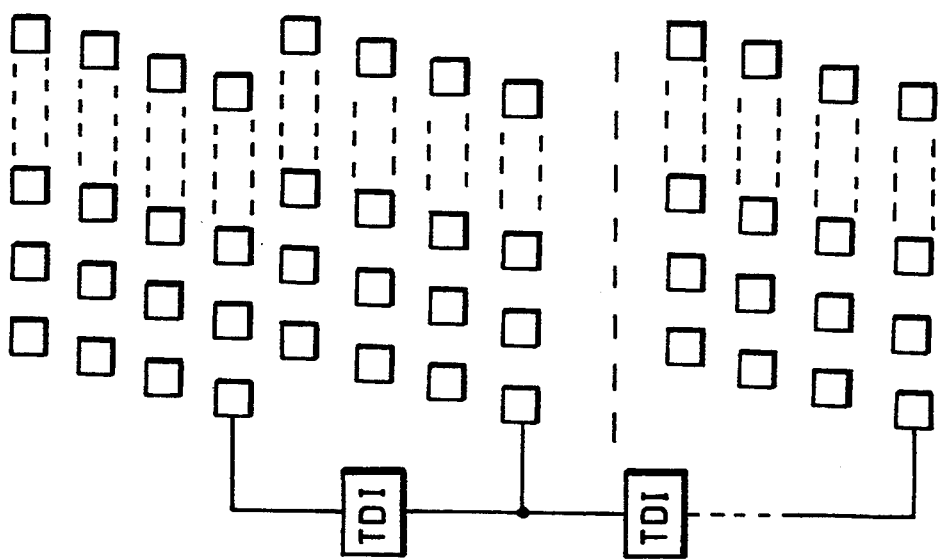

In fact, two types of combined organization, illustrated in FIGS. 11a and 11b respectively, are possible:

a detector where the pattern of offset rows, of the type shown in FIG. 7, is repeated n times; in this case, the distance d1 between offset rows is far smaller than distance d2 between aligned rows;

that where the pattern of aligned rows, illustrated in FIG. 8, is repeated n times with, at each repetition, the rows offset in a similar way to that illustrated in FIG. 7; in this case, distance d2 is far smaller than distance d1.

In either combination, the aligned rows are coupled via integration and intermediate storage capacitors forming circuits known as "TDI circuits" because they manage time in the TDI mode as described previously. To improve legibility, FIGS. 11a and 11b only show the TDI circuits for the first aligned sensors. Provided the charges are transferred from these rows using the integration and intermediate capacitor storage periods corresponding to the required standard, as described previously, these rows can be considered as a single "master row" generating a signal k times stronger and noise $\sqrt{k}$ times stronger than a single row.

The signals produced by the n offset master rows are then processed using one of the methods described previously to process the charges output by offset rows of sensors, i.e. either by transmission to n charge-transfer circuits coupled to $n-1$ delay lines or by transmission to a single charge transfer circuit via as many delay lines as they are sensors excluding, obviously, those in the first master row.

What is claimed is:

1. A multi-standard observation camera, comprising:
    a detector having a predetermined length and being photosensitive to a predetermined spectrum band, said detector including a plurality of sensor elements arranged in horizontal rows along the predetermined length of said detector;
    an optomechanical projector and scanning system for projecting an observed image onto a focal plane coinciding with the plane of the detector, said image having a width substantially equal to said predetermined length of the detector, said projection and scanning system scanning said image across said detector in a vertical direction;
    a read circuit connected to said detector, said read circuit receiving charges output from said plurality of sensors which charges are proportional to illumination received by said plurality of sensors;
    a clock sequencer for controlling the transfer and multiplexing of said charges, said clock sequencer operating in synchronization with a vertical scan wherein said read circuit outputs a video signal to a display monitor operating in a predetermined television standard, said standard being defined by one of a line frequency and a sampling frequency characteristic of the images displayed,
    wherein said clock sequencer, said read circuit and said detector are in a cryostat and wherein said clock sequencer includes programmable time-counting resources to define periods over which said charges are integrated and instants at which said charges are transferred and multiplexed, after integration, into said read circuit, said counting resources being preset by a memory positioned outside said cryostat, said memory containing instructions for synchronizing the integration periods and transfer and multiplexing instants with said one of said line frequency and said sampling frequency chosen from several standards preselected in said memory and corresponding to a display monitor standard.

2. An observation camera as claimed in claim 1, wherein the counting resources include a first series of programmable counters (CP1 to CP6) which define the instants at which charge integration in the integration capacitors ($C_{ia}$ to $C_{if}$) begin, each programmable counter being coupled to an adjustable counter (CR1 to CR6), said adjustable counters forming a second series of counters which define the period during which charges are integrated in the integration capacitors ($C_{ia}$ to $C_{if}$) and the instants of transfer into the intermediate capacitors ($C'_{ia}$ to $C'_{if}$, $C''_{ia}$ to $C''_{if}$), said second series of counters (CR1 to CR6) being controlled, in time, by the outputs from the first series of counters (CP1 to CP6 respectively).

3. An observation camera as claimed in claim 1 wherein the counting resources comprise a first series of FIFO memories (F1 to F6), each FIFO memory being coupled to a group of secondary FIFO memories (F11 to F14, F21 to F24, F31 to F34, F41 to F44, F51 to F54 and F61 to F64 respectively), the first series of FIFO memories (F1 to F6) defining the instants at which integration of the charges in the integration capacitors ($C_{ia}$ to $C_{if}$) starts and the groups of secondary FIFO memories forming a second series of FIFO memories, each secondary FIFO memory being reloadable to output, as appropriate to the selected display standards, a period for integration in the intermediate capacitors ($C_{ia}$ to $C_{if}$ and $C''_{ia}$ to $C''_{if}$), the secondary FIFO memories in the second series being triggered by the respective outputs from the first series of FIFO memories.

4. An observation camera as claimed in any of the claims 1, 2 or 3 in which detector sensor elements are organized into several offset rows (SR1 to SR4) to satisfy the sampling requirements.

5. An observation camera as claimed in any of claims 1, 2 to 3 in which the detector sensor elements are organized into several aligned rows (SR'1 to SR'4) to operate in the TDI mode.

6. An observation camera as claimed in any of claims 1, 2 or 3 in which the detector sensor elements are organized into offset blocks (A, B), the rows within each block being aligned.

7. An observation camera as claimed in any of claims 1, 2 or 3 in which the detector sensor elements are organized into aligned blocks, the rows within each block being offset.

8. A surveillance system including a multi-standard observation camera, said system comprising:
    a detector having a predetermined length and being photosensitive to a predetermined spectrum band, said detector including a plurality of sensor elements arranged in horizontal rows along the predetermined length of said detector;
    an optomechanical projector and scanning system for projecting an observed image onto a focal plane coinciding with the plane of the detector, said image having a width substantially equal to said predetermined length of the detector, said projection and scanning system scanning said image across said detector in a vertical direction;
    a read circuit connected to said detector, said read circuit receiving charges output from said plurality of sensors which charges are proportional to illumination received by said plurality of sensors;
    a clock sequencer for controlling the transfer and multiplexing of said charges, said clock sequencer operating in synchronization with a vertical scan wherein said read circuit outputs a video signal to a display monitor operating in a predetermined television standard, said standard being defined by one of a line frequency and a sampling frequency characteristic of the images displayed,
    wherein said clock sequencer, said read circuit and said detector are in a cryostat and wherein said clock sequencer includes programmable time-counting resources to define periods over which said charges are integrated and instants at which said charges are transferred and multiplexed, after integration, into said read circuit, said counting resources being preset by a memory positioned outside said cryostat, said memory containing instructions for synchronizing the integration periods and transfer and multiplexing instants with said one of said line frequency and said sampling frequency chosen from several standards preselected in said memory and corresponding to a display monitor standard.

* * * * *